United States Patent

Kimura et al.

[11] Patent Number: 6,003,393
[45] Date of Patent: Dec. 21, 1999

[54] MOTOR-DRIVEN CYLINDER

[75] Inventors: Kunimasa Kimura; Shigehiro Toyoda, both of Toyokawa; Isao Murata, Hoi-gun, all of Japan

[73] Assignee: Sintokogio, Ltd., Nagoya, Japan

[21] Appl. No.: 08/945,723

[22] PCT Filed: Mar. 27, 1997

[86] PCT No.: PCT/JP97/01052

§ 371 Date: Jun. 4, 1998

§ 102(e) Date: Jun. 4, 1998

[87] PCT Pub. No.: WO97/37422

PCT Pub. Date: Oct. 9, 1997

[30] Foreign Application Priority Data

Mar. 29, 1996 [JP] Japan .................................... 8-104103

[51] Int. Cl.⁶ .................................................. F16H 25/20
[52] U.S. Cl. .................................. 74/89.15; 74/424.8 R; 254/92
[58] Field of Search .......................... 74/89.15, 424.8 R; 254/92

[56] References Cited

U.S. PATENT DOCUMENTS

| 703,251 | 6/1902 | Haire ..................................... 254/92 X |
| 1,498,062 | 6/1924 | Albaugh ................................. 254/29 R |
| 2,983,159 | 5/1961 | Zeligowsky et al. .............. 74/424.8 R |
| 3,208,372 | 9/1965 | Taylor .................................... 100/98 R |
| 3,911,810 | 10/1975 | Standbridge ............................ 100/290 |
| 4,585,147 | 4/1986 | Wodnicki ........................... 74/89.15 X |
| 4,632,183 | 12/1986 | McLeod ................................. 166/77.4 |
| 4,995,278 | 2/1991 | Huang ..................................... 74/89.15 |
| 5,404,676 | 4/1995 | Sutherland ............................. 74/89.15 |

FOREIGN PATENT DOCUMENTS 7-274437   10/1995   Japan .

*Primary Examiner*—Allan D. Herrmann
*Attorney, Agent, or Firm*—Limbach & Limbach L.L.P.

[57] ABSTRACT

The electric cylinder consists of an electromotor 1, a plurality of parallel ball screws 4 connected to the electromotor 1 via transmission members 3, a plurality of ball nuts 5 mating with the ball screws 4, a slider 6 for consolidating the ball nuts 5 into one body, and a rod 7 fixedly mounted to the slider 6. The electric cylinder has a high thrust so that it can replace an oil pressure cylinder so that those cylinders used in a plant are unified into electric cylinders to achieve their efficient maintenance.

1 Claim, 1 Drawing Sheet

MOTOR-DRIVEN CYLINDER

TECHNICAL FIELD

This invention relates to an electric cylinder used in various plants, which require an extremely high thrust.

BACKGROUND ART

It is well known that cylinders are widely used in various plants. An oil-pressure cylinder is normally used when high thrust is needed to push a row of platform trucks, especially ones whose total weight exceeds one hundred tons. Electric cylinders are mainly used when no particularly high thrust is needed.

If the above-mentioned oil-pressure cylinder can be replaced by an electric cylinder, the cylinders used in a plant can be combined into one type of electric cylinder. Such unification is very advantageous for their maintenance.

However, the manufacture of a high-thrust electric cylinder with thrust high enough to replace the oil-pressure cylinder is very difficult, because ball screws for both high-load and small-lead use are seldom on the market and are rarely available. Moreover, due to extraordinarily high cost it is not practical to either manufacture ball screws by oneself or have them custom-made. Thus, the necessity of using both oil-pressure and elecric cylinders is unavoidable and causes great inconvenience in maintaining the cylinders.

DISCLOSURE OF INVENTION

This invention was made to solve the above problems. Its purpose is to provide a high-thrust electric cylinder so as to unify the type of cylinders that must be used in a plant into the use of electric cylinders only to achieve more efficient maintenance of the cylinders.

To achieve the above purpose the electric cylinder of this invention comprises an electromotor, a plurality of parallel ball screws connected to the electromotor via transmission members, a plurality of ball nuts mating with the ball screws, a slider for consolidating the ball nuts into one body, and a rod fixedly mounted on the slider.

MODES FOR CARRYING OUT THE INVENTION

Figure 1:
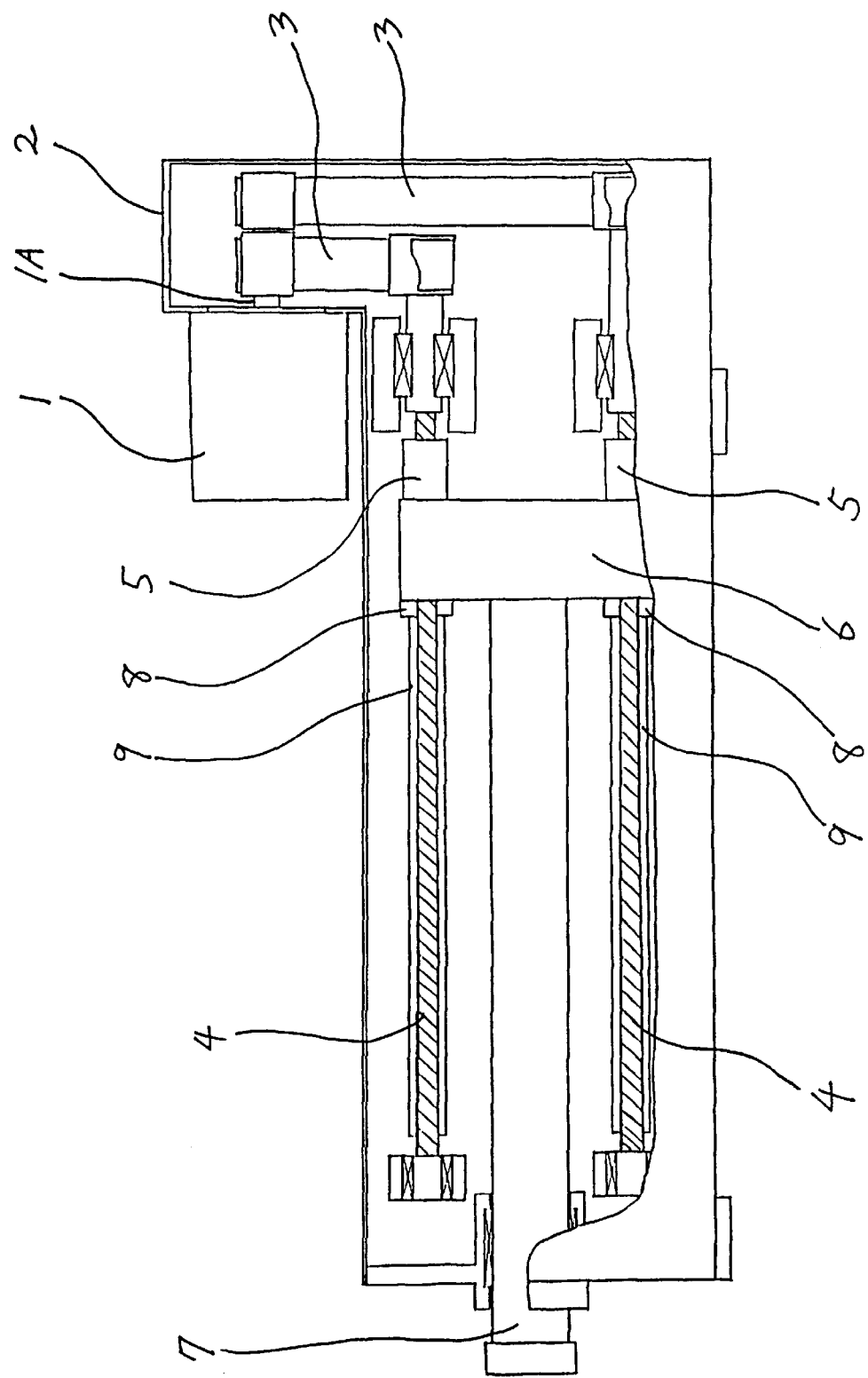
FIG. 1 is a vertical section showing an embodiment of this invention.

An embodiment of this invention will now be explained by reference to FIG. 1. An electromotor 1 is mounted on the outside of a cylinder case 2. The shaft 1A of the electromotor 1 penetrates the inside of the cylinder case 2. The shaft 1A is connected with two parallel ball screws 4,4 via transmission members 3,3. Two ball nuts 5,5 mate with the ball screws 4,4. A slider 6 is fixed to the ball nuts 5,5 such that the two ball nuts 5,5 and the slider 6 are consolidated into one body. A rod 7 is mounted on the slider 6 such that the tip of the rod 7 protrudes from the cylinder case 2. Two linear guides 8,8 are mounted on the slider 6, and two guide rails 9,9 corresponding to the linear guides are fixed to the inner wall of the cylinder case 2.

The practical operation of the above electric cylinder will now be explained. The rotational drive shaft 1A of the electromotor is transmitted to the two parallel ball screws 4,4 via transmission members 3,3 so as to rotate the ball screws 4,4. The rotation of the ball screws 4,4 makes the two ball nuts 5,5 mating with the ball screws 4,4, the slider 6 mounted thereon, and the rod mounted on the slider 6 move forward or backward correspondingly to the rotational direction of the elecromotor 1. The load, exerted on the rod 7 when a platform truck is pushed out, is shared and supported, via the slider 6, by the two parallel ball screws 4,4 and the two ball nuts 5,5. The linear guides 8,8 and the guide rails 9,9 serve to stop the rotational movement of the slider 6.

Although in the embodiment the two ball screws 4,4 and the two ball nuts 5,5 are used, any number of ball screws and ball nuts can also be used.

EFFECTS OF THE INVENTION

As is clear from the above descriptions, since in the electric cylinder of this invention the load exerted on the rod when it is going to push an object out is shared by a plurality of both normal ball screws and ball nuts, a high-thrust electric cylinder can be manufactured without using high-load and small-lead ball screws, which are not readily available. All cylinders used in a plant can thus be unified into the use of a single type of electric cylinder by replacing oil-pressure cylinders with the electric cylinders of this invention. This greatly enhances the maintenance efficiency of the cylinders used in the plant.

We claim:

1. An electric cylinder comprising:

an electromotor including a body and a rotatable shaft which protrudes from the body in a first direction, a plurality of ball screws, each oriented parallel to the shaft, a plurality of transmission members, wherein each of the transmission members is separately and perpendicularly connected between the shaft and a different one of the ball screws such that neither the body of the electromotor nor any of the ball screws extends in the first direction beyond the shaft, a plurality of ball nuts mating with said ball screws, a slider coupled to the ball nuts for consolidating said ball nuts into one body, and a rod fixedly mounted to the slider.

* * * * *